United States Patent Office 3,167,596
Patented Jan. 26, 1965

3,167,596
STABILIZATION OF A POLYMERIZABLE SYSTEM
Louis A. Joo, Crystal Lake, Ill., assignor to The Pure Oil Company, Chicago, Ill., a corporation of Ohio
No Drawing. Filed Oct. 25, 1961, Ser. No. 147,474
13 Claims. (Cl. 260—666.5)

This invention relates to polymerization inhibitors and, more particularly, to the addition of a small amount of a dialkenyl heterocyclic amine to unsaturated polymerizable compounds to inhibit the polymerization thereof.

The addition of inhibitors, such as p-t-butyl catechol, to unsaturated compounds which polymerize readily in order to retard the polymerization of such unsaturated compounds is well known. For example, unsaturated polyesters, particularly mixtures of unsaturated polyesters with polymerizable monomers, are not stable and will polymerize upon standing, even at room temperature. Styrene will even polymerize by itself, especially when it is exposed to air and sunlight. The polymerization starts slowly, but is soon accelerated by the peroxides formed by auto-oxidation in air. "Polyesters" by Bjorksten, published in 1956 by Reinhold Publishing Corporation, New York, describes stabilizing agents for styrene on page 30, and for unsaturated polyesters on pages 52 to 58.

This invention is based upon my discovery that dialkenyl amines derived from aromatic heterocyclic amines are effective polymerization retarders when used at low concentrations, preferably within the range of about 0.1–5.0% by weight, in unsaturated systems. These compounds are added to unsaturated polymerizable organic compounds to improve their "tank" or "shelf-life." Examples of unsaturated compounds to which the polymerization inhibitors of this invention may be added to retard the polymerization thereof include unsaturated polymers, e.g., unsaturated polyester resins such as diallyl maleate; unsaturated monomers, e.g., styrene, divinylbenzene, diallylphthlate, butadiene, isoprene, acrylonitrile, etc.; and mixtures of unsaturated polymers and unsaturated monomers, e.g., a mixture of glycol maleate and styrene. For the purpose of this invention, the terms "monomer" and "polymer" are used generically. The term "monomers" includes individual polymerizable compounds as well as polymerizable mixtures of compounds, and the term "polymers" includes homopolymers, copolymers, and heteropolymers. This usage is common in the art, and is found on pages 1 to 10 of "Polymers and Resins," by Golding, published in 1959 by D. Van Nostrand Company, Inc. Unsaturated polymerizable compounds containing the dialkenyl amines are easier to cure than solutions containing some of the prior art polymerization inhibitors. Another advantage of using the dialkenyl amines is their superior thermal stability. For example, diallyl dipyridil is stable at temperatures as high as 120° C., while p-t-butyl catechol is thermally unstable, as discussed on page 31 of "Polyester Resins," by Lawrence, published in 1960 by Reinhold Publishing Corporation, New York.

On page 52 of "Polyesters," Bjorksten discussed two general types of inhibitors, viz., retardants and stabilizers. According to his definition, the inhibitors of this invention can be considered to be stabilizers, since a styrene solution of the inhibitor and methyl ethyl ketone peroxide can be stored for several days at room temperature without polymerization, but at elevated temperatures, the catalyzed polymerization and gelation takes place very rapidly, indicating that the inhibitor permits a fast and complete cure at molding temperatures.

It is an object of this invention to provide a polymerization inhibitor for unsaturated polymerizable compounds.

Another object of this invention is to provide a method of inhibiting the polymerization of unsaturated polymerizable compounds by adding a small amount of a dialkenyl amine derived from an aromatic heterocyclic amine.

A further object of this invention is to provide a polymerization inhibitor for unsaturated polymerizable compounds which permits a fast and complete cure.

A still further object of this invention is to provide a polymerization inhibitor for unsaturated polymerizable compounds which is thermally stable.

These and further objects of this invention will become apparent as the description proceeds.

The polymerization inhibitors of this invention are disclosed and claimed as novel compounds in the copending application of Louis A. Joo and Walter E. Kramer, Serial No. 99,721, filed March 31, 1961. In preparing the dialkenyl amines in accordance with the process described in the aforementioned copending patent application of Joo et al., a dispersion of an alkali metal, such as sodium, lithium, potassium, or sodium-potassium alloys, is formed in an inert liquid. The solvent or reaction medium used is preferably a highly refined mineral oil, such as a white oil, although other inert solvents or diluents can be used, such as hydrogenated aromatic extracts of mineral oils, xylene, and ethers and acetals, such as diethyl ether, dipropyl ether, dioctyl ether, dimethoxyethane, methylal, dimethyl ether of diethylene glycol, dimethyl ether of tetraethylene glycol, dimethyl sulfoxide, etc. When liquid sodium-potassium alloys are used, a mixed sodium-potassium product is obtained, and in some instances the solvent may be eliminated. The dispersion of the alkali metal in the inert solvent is then added to an aromatic heterocyclic amine, such as pyridine, quinoline, acridine, or derivatives thereof containing only inert substituents which are inert toward alkali metals, e.g., picoline, lutidine, esters or salts of nicotinic acid, 2-benzylpyridine, 2,3,6-collidine, etc., while maintaining the reaction at a relatively low temperature, e.g., −50° to +100° C., preferably +50 to +100° C. Under these conditions, the alkali metal reacts with the aromatic heterocyclic amine, i.e., adds at the nitrogen atom, with the result that the aromatic amine dimerizes and there is formed a dialkali metal amide of the aromatic amine dimer. In the case of pyridine and sodium, the reaction is as follows:

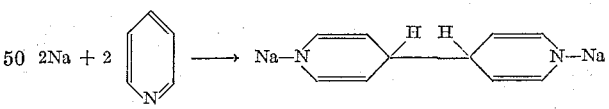

Since this reaction is one which takes place with all of the aromatic heterocyclic amines, the general reaction is reported as follows:

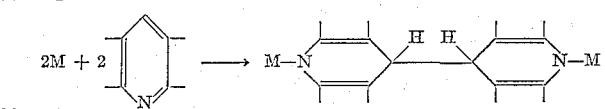

where M is an alkali metal, and

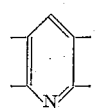

represents the nucleus of an aromatic heterocyclic amine.

After the intermediate alkali metal diamide of the aromatic amine is formed, it is reacted in suspension or solution with a monohalo-alkene, preferably a $C_2$–$C_{20}$ alkenyl monohalide. In carrying out this reaction, any inert solvent can be used which is unreactive toward the reactants and which has physical properties which make it generally suitable as a reaction medium. Any of the solvents used in the preparation of the intermediate diamide may be used in the reaction which produces the product dialkenyl amines. The reaction is carried out at a temperature in the range from 0° C. to the reflux temperature of the alkenyl monohalide, and is preferably carried out at temperatures in the range from about 0° to 75° C. Alkenyl monohalides which can be used and which are illustrative of the scope of this reaction include vinyl chloride, vinyl bromide, vinyl iodide, 3-chloropropene, 3-bromopropene, 4-chloro-2-butene, 5-bromo-3-pentene, 1-chloro-2-octene, 1-chloro-12-octadecene, and 1-bromo-12-eicosene.

The product dialkenyl amine, which is of the formula:

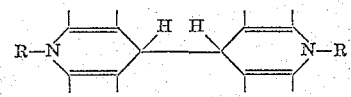

where R is the alkenyl radical of the alkenyl monohalide which is reacted with the alkali metal diamine, can be obtained in a pure form by a variety of product-purification techniques. The product may be recovered by extraction or by fractional crystallization, by stripping out the solvent, and washing out impurities, or by converting the product to a water-soluble derivative, followed by extraction with water and reconversion of the derivative to the water-insoluble product.

In order to illustrate the manner in which the polymerization inhibitors of this invention may be prepared, a sodium dispersion is prepared by heating two mols (45 g.) of sodium and 500 g. of xylene above the melting point of sodium with agitation. The dispersion is then cooled to about 50° C. and 300 ml. of pyridine are added, whereupon the solution turns first yellow and then black. After heating for about 4–6 hours at 50° C., two mols of 3-chloropropene are added drop-wise, while stirring is continued. After all of the halide has been added, the mixture is stirred for an additional four-hour period to assure completion of reaction. The unreacted pyridine is distilled off, and the mixture is acidified with hydrochloric acid. The resulting aqueous phase containing the amine hydrochloride salt is separated and neutralized, whereupon the product separates from the water. The product which is obtained in this manner is dipropenyl tetrahydrodipyridyl,

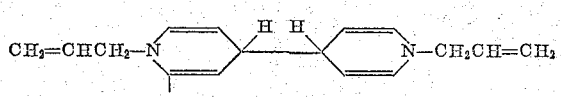

In order to demonstrate the effectiveness of the dialkenyl amines as polymerization inhibitors, an experiment was conducted using diallyl tetrahydrodipyridyl, prepared as previously described, as a typical example of the class. Small amounts of diallyl tetrahydrodipyridyl and p-t-butyl catechol, a well known polymerization inhibitor, were added to separate portions of styrene containing the original polymerization inhibitor as received from the supplier. A small amount of methyl ethyl ketone peroxide, 0.26% by weight of the solution, was added to each solution to accelerate the test since polymerization during storage is known to be due to the formation of peroxides. Then, the solutions were stored at room temperature, and their viscosities, which are indicative of polymerization were checked periodically, using a Gardner Bubble Viscometer. The results are given in Table I.

Table I

| Sample Number | Methyl Ethyl Ketone Peroxide Concentration (Weight Percent) | Added Stabilizer | Stabilizer Concentration (Weight Percent) | Viscosity (Poises) After | | | |
|---|---|---|---|---|---|---|---|
| | | | | 1 Day | 5 Days | 10 Days | 13 Days |
| 1 | 0.26 | None | 0.0 | <0.5 | 0.78 | 9.0 | 40.0 |
| 2 | 0.26 | p-t-butyl catechol | 0.12 | <0.5 | <0.5 | 5.5 | 27.0 |
| 3 | 0.26 | Diallyl tetrahydrodipyridyl | 0.12 | <0.5 | 0.62 | 7.2 | 32.0 |
| 4 | 0.26 | do | 0.20 | <0.5 | <0.5 | 7.0 | 28.0 |
| 5 | 0.26 | do | 2.00 | <0.5 | <0.5 | <0.5 | 0.5 |

From an inspection of Table I it will be seen that diallyl tetrahydrodipyridyl is an effective polymerization inhibitor. In comparing Sample #2, which contains, 0.12% by weight of p-t-butyl catechol, with Samples #3 and #4, containing 0.12 and 0.20% by weight, respectively, of diallyl tetrahydrodipyridyl, it will be seen that more diallyl tetrahydrodipyridyl than p-t-butyl catechol is required for the same inhibiting effect. This difference may be attributable to the difference in molecular weights of the two compounds.

In order to demonstrate that diallyl tetrahydrodipyridyl permits a fast and complete cure at the molding temperature of styrene, another set of solutions, identical to those described above, was prepared, the samples were maintained at 90° C., and the time required for complete gelation noted for each. From an examination of the results given in Table II, it is apparent that the solution containing diallyl tetrahydrodipyridyl is much easier to cure than the solution containing p-t-butyl catechol.

Table II

| Sample Number | Methyl Ethyl Ketone Peroxide Concentration (Weight Percent) | Stabilizer | Stabilizer Concentration (Weight percent) | Gel Time at 90° C., Hours |
|---|---|---|---|---|
| 6 | 0.26 | None | 0.0 | 5 |
| 7 | 0.26 | Diallyl tetrahydrodipyridyl | 0.12 | 5 |
| 8 | 0.26 | p-t-butyl catechol | 0.12 | 6 |
| 9 | None | Diallyl tetrahydrodipyridyl | 0.12 | 12 |
| 10 | None | p-t-butyl catechol | 0.12 | >20 |

To further demonstrate the superiority of the dialkenyl amines as polymerization inhibitors, two samples of styrene, one containing 2.35 weight percent of diallyl tetrahydrodipyridyl, and the other containing 2.35 weight percent of p-t-butyl catechol, were cured at 90° C. for two weeks. The samples were then tested for hardness with a Barber-Colman impressor at room temperature. The sample which contained p-t-butyl catechol was still a soft gel at the end of the two-week period, having a Barcol hardness of less than 5, and still had a styrene odor, indicating an incomplete cure. On the other hand, the sample which contained diallyl tetrahydrodipyridyl had a Barcol hardness of 70, and had no styrene odor, indicating that the diallyl tetrahydrodipyridyl had not prevented a complete cure.

From these experiments, it will be seen that dialkenyl tetrahydrodipyridyl compounds are effective polymerization inhibitors for unsaturated polymerizble compounds The embodiments of the invention in which an exclusive property or privilege is claimed are as follows:

1. A composition consisting essentially of a major portion of a polymerizable system containing at least one compound having ethylenic unsaturation and a minor portion of a compound of the formula,

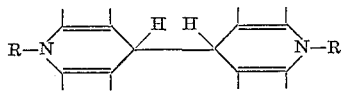

wherein R is a C₂–C₂₀ alkenyl radical and

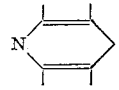

represents a ring structure of the group consisting of

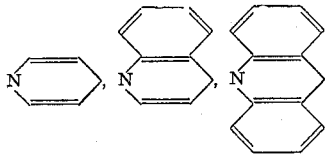

and derivatives thereof which are inert toward alkali metals, said compound being present in an amount sufficient to inhibit polymerization of said system but insufficient to prevent complex curing thereof.

2. A composition in accordance with claim 1 in which said polymerizable system is of the group consisting of individual polymerizable monomers, polymerizable mixtures of monomers, polymerizable homopolymers, polymerizable copolymers, polymerizable heteropolymers, and polymerizable mixtures thereof.

3. A composition in accordance with claim 2 which contains said compound having nitrogen-containing nuclei in an amount sufficient to inhibit the polymerization of said polymerizable system.

4. A composition in accordance with claim 3 which contains said compound having nitrogen-containing nuclei in an amount of about 0.1–5.0% by weight of said polymerizable system.

5. A composition in accordance with claim 4 in which said polymerizable system consists essentially of styrene.

6. A composition in accordance with claim 5 in which said compound having nitrogen-containing nuclei is derived from pyridine.

7. A composition in accordance with claim 5 in which said compound having nitrogen-containing nuclei is dipropenyl tetrahydrodipyridyl.

8. The method of inhibiting the polymerization of a polymerizable system containing at least one compound having ethylenic unsaturation which comprises adding to said polymerizable system, in an amount sufficient to inhibit the polymerization thereof, a compound of the formula,

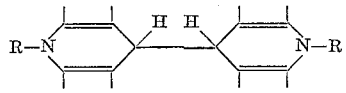

wherein R is a C₂–C₂₀ alkenyl radical and

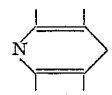

represents a ring structure of the group consisting of

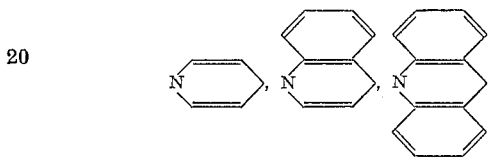

and which are inert toward alkali metals derivatives thereof.

9. The method in accordance with claim 8 in which said compound having nitrogen-containing nuclei is added in an amount of about 0.1–5.0% by weight of said polymerizable system.

10. The method in accordance with claim 9 in which said polymerizable system is of the group consisting of individual polymerizable monomers, polymerizable mixtures of monomers, polymerizable homopolymers, polymerizable copolymers, polymerizable heteropolymers, and polymerizable mixtures thereof.

11. The method in accordance with claim 10 in which said polymerizable system consists essentially of styrene.

12. The method in accordance with claim 11 in which said compound having nitrogen-containing nuclei is derived from pyridine.

13. The method in accordance with claim 12 in which said compound having nitrogen-containing nuclei is dipropenyl tetrahydrodipyridyl.

References Cited in the file of this patent

Campbell: Chem. Abstracts, vol. 53, col. 1814 (1959).
Michalski et al.: Chem. Abstracts, vol. 54, cols. 3047–8 (1960).
Homer et al.: Chem. Abstracts, vol. 54, col. 21602 (1960).

UNITED STATES PATENT OFFICE
CERTIFICATE OF CORRECTION

Patent No. 3,167,596

January 26, 1965

Louis A. Joo

It is hereby certified that error appears in the above numbered patent requiring correction and that the said Letters Patent should read as corrected below.

Column 5, line 29, for "complex" read -- complete --; column 6, lines 25 and 26, for "and which are inert toward alkali metals derivatives thereof." read -- and derivatives thereof which are inert toward alkali metals. --.

Signed and sealed this 20th day of July 1965.

(SEAL)
Attest:

ERNEST W. SWIDER
Attesting Officer

EDWARD J. BRENNER
Commissioner of Patents